US012705193B2

(12) United States Patent
Teo

(10) Patent No.: US 12,705,193 B2
(45) Date of Patent: Aug. 11, 2026

(54) NAVIGATION DEVICE, NAVIGATION SYSTEM INCLUDING THE SAME AND OPERATING METHOD THEREOF

(71) Applicant: PIXART IMAGING INC., Hsin-Chu County (TW)

(72) Inventor: Wai-Lian Teo, Penang (MY)

(73) Assignee: PIXART IMAGING INC., Hsin-Chu County (TW)

( * ) Notice: Subject to any disclaimer, the term of this patent is extended or adjusted under 35 U.S.C. 154(b) by 109 days.

(21) Appl. No.: 18/471,335

(22) Filed: Sep. 21, 2023

(65) Prior Publication Data

US 2025/0103525 A1 Mar. 27, 2025

(51) Int. Cl.
*G06F 13/20* (2006.01)
*G06F 13/42* (2006.01)

(52) U.S. Cl.
CPC .......... *G06F 13/20* (2013.01); *G06F 2213/40* (2013.01)

(58) Field of Classification Search
CPC ............................ G06F 13/28; G06F 13/4282
See application file for complete search history.

(56) References Cited

U.S. PATENT DOCUMENTS 11,151,068 B1 * 10/2021 Haldar .................... G06F 13/28
2004/0205268 A1 * 10/2004 Takinosawa ............ G06F 21/85 710/52
2005/0215248 A1 * 9/2005 Brookshire ....... H04W 52/0287 455/426.1
2008/0077722 A1 * 3/2008 Tang ..................... G06F 13/385 710/49
2014/0089544 A1 * 3/2014 Baba ..................... G06F 13/362 710/110
2015/0372746 A1 * 12/2015 Xie ........................ H04W 4/80 455/11.1
2016/0020927 A1 * 1/2016 Shiozaki ............... H04L 27/127 375/297
2016/0371214 A1 * 12/2016 Szeto ..................... G06F 13/28
2024/0152480 A1 * 5/2024 Wang ................. G06F 13/4282

* cited by examiner

*Primary Examiner* — Getente A Yimer
(74) *Attorney, Agent, or Firm* — HAUPTMAN HAM, LLP

(57) ABSTRACT

There is provided an operating method of a navigation system. The navigation system includes a master device and a slave device connected via a clock line and an SDIO/MOTION line. The operating method includes: setting a data direction of an SDIO/MOTION port of the slave device as an output state upon not receiving a clock signal from the master device via the clock line to be able to output a motion interrupt; and changing the data direction of the SDIO/MOTION port of the slave device to an input state upon receiving the clock signal from the master device via the clock line to be able to receive an address byte; and keeping the data direction at the output state after a data transaction completed.

20 Claims, 5 Drawing Sheets

NAVIGATION DEVICE, NAVIGATION SYSTEM INCLUDING THE SAME AND OPERATING METHOD THEREOF

FIELD OF THE DISCLOSURE

This disclosure generally relates to a navigation system adopting a 2-wire interface and, more particularly, to an optical navigation system that transmits communication data and a motion interrupt between a master device and slave device via the same signal line, and an operating method of the optical navigation system.

BACKGROUND OF THE DISCLOSURE

A slave device that uses a 4-wire serial peripheral interface (SPI) generally includes a master-in-slave-out (MISO) pin, a master-out-slave-in (MOSI) pin, an SCLK pin and an NCS pin. The SCLK pin is used to receive a clock signal SCLK. The NCS pin is also called an SPI chip select pin, which is used for receiving a command indicating which chip is to be read.

On the sensor chip of a navigation device that adopts the 4-wire SPI and detects a motion, it is required to add an additional pin (called motion pin) for transmitting the detected motion. Traditionally, it is possible to share the MISO pin with the motion pin to reduce a total number of pins.

Please refer to FIG. 1, it is a signal timing diagram between a master device and a slave device in the conventional 4-wire SPI. When a voltage level on the NCS pin is high (e.g., NCS=1'b1), an MISO/MOTION pin is used to transmit a motion signal; whereas, when the voltage level on the NCS pin is low (e.g., NCS=1'b0), the MISO/MOTION pin is used to transmit SPI communication data.

More specifically, the conventional method shown in FIG. 1 uses the NCS pin as a selector to realize the purpose of transmitting two types of data via the same pin.

However, although the method in FIG. 1 can be implemented easily, this method cannot be applied to a 2-wire SPI since the 2-wire SPI does not have an NCS pin and cannot be applied to a 3-wire SPI since the 3-wire SPI does not have an MISO pin. Furthermore, it is seen from FIG. 1 that in the write operation (shown as WRITE), the MISO/MOTION signal line is totally idle without being utilized efficiently.

SUMMARY

Accordingly, the present disclosure provides a navigation device, a navigation system and an operating method thereof that combines a motion pin to an SDIO pin (or called data pin) to avoid arranging an additional motion pin.

The present disclosure provides a navigation device, a navigation system and an operating method thereof that determine data content to be transmitted via an SDIO/MOTION pin according to a clock signal SCLK.

The present disclosure provides a navigation system including a master device and a slave device. The master device, configured to output a clock signal and an address byte. The slave device communicates with the master device using a 2-wire interface, and configured to set a data direction of an SDIO/MOTION port thereof as an output state to output a motion interrupt upon not receiving the clock signal via a clock line of the 2-wire interface, and change the data direction of the SDIO/MOTION port to an input state to receive the address byte from the master device upon receiving the clock signal via the clock line of the 2-wire interface.

The present disclosure further provides a navigation device for communicating with a master device via a 2-wire interface. The navigation device includes a clock port and an SDIO/MOTION port. The clock port is configured to receive a clock signal via a clock line of the 2-wire interface. A data direction of the SDIO/MOTION port is set as an output state to output a motion interrupt upon the clock port not receiving the clock signal via the clock line of the 2-wire interface, and the data direction of the SDIO/MOTION port is changed to an input state to receive an address byte from the master device upon the clock port receiving the clock signal via the clock line of the 2-wire interface.

The present disclosure further provides an operating method of a navigation system. The navigation system includes a master device and a slave device performing a communication therebetween via a 2-wire interface. The operating method includes the steps of: setting a data direction of an SDIO/MOTION port of the slave device as an output state to output a motion interrupt upon the communication not occurring; and setting the data direction of the SDIO/MOTION port of the slave device to an input state to receive an address byte from the master device upon the communication occurring.

In the present disclosure, the motion interrupt is outputted to the maser device only when the slave device detects a motion.

In the present disclosure, said communication is referred to a data transaction.

In the present disclosure, the motion interrupt does not contain motion data. The motion data is further transmitted in the data transaction after the master device polls the slave device.

BRIEF DESCRIPTION OF DRAWINGS

Other objects, advantages, and novel features of the present disclosure will become more apparent from the following detailed description when taken in conjunction with the accompanying drawings.

DETAILED DESCRIPTION OF THE DISCLOSURE

It should be noted that, wherever possible, the same reference numbers will be used throughout the drawings to refer to the same or like parts.

One objective of the present disclosure is to provide a navigation system and an operating method thereof that utilize the same data/motion signal line (shown as SDIO/

Figure 1:
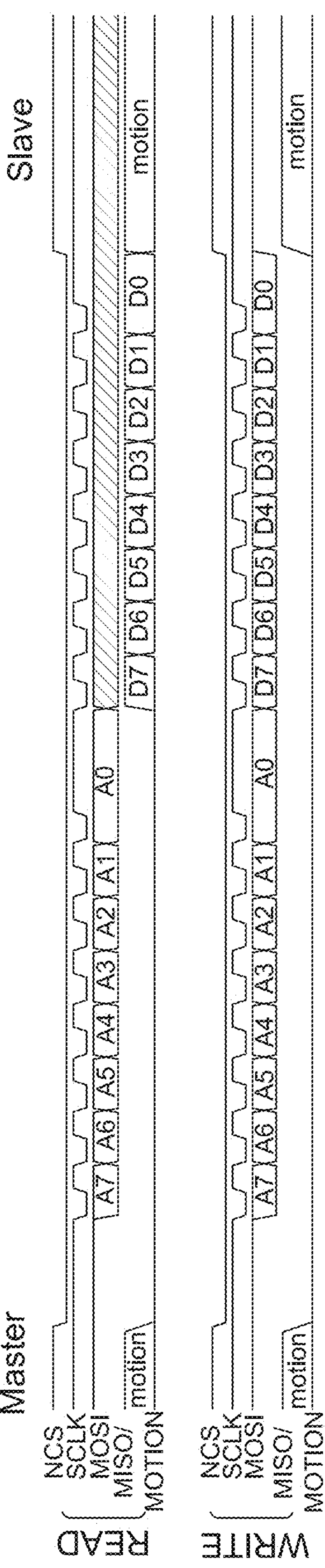
FIG. 1 is a signal timing diagram in a conventional 4-wire SPI between a master device and a slave device.
Figure 2:
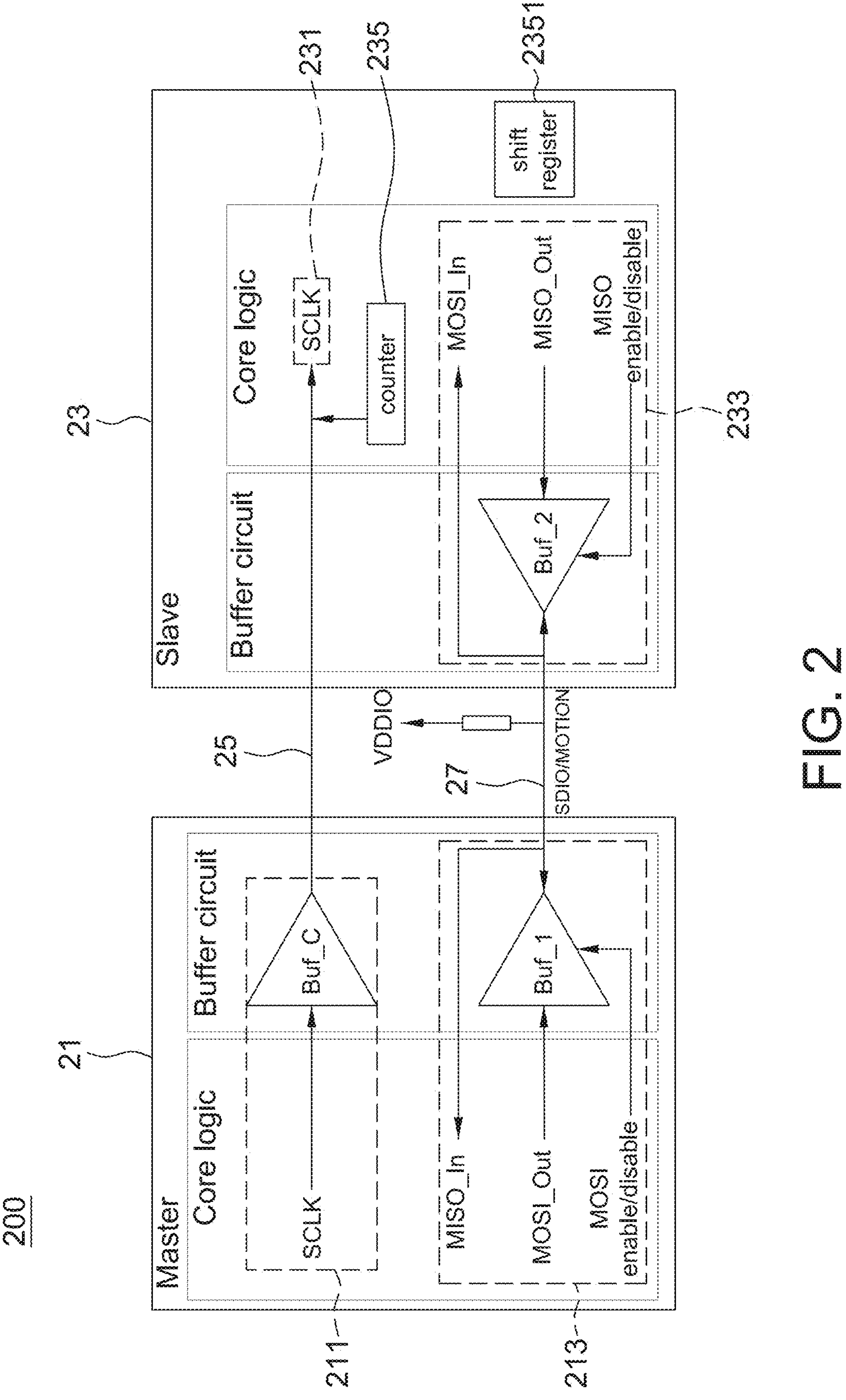
FIG. 2 is a schematic block diagram of a navigation system connected via a 2-wire interface according to one embodiment of the present disclosure.

MOTION in FIG. 2) in a 2-wire interface to communicate both SPI communication data and a motion interrupt. When receiving a clock signal SCLK (e.g., when no communication occurs between a slave device and a master device, and the clock signal SCLK changes from a high level to a low level) via the 2-wire interface, the slave device changes a data direction thereof to an output state (i.e. slave drive). In this way when a motion is detected, the slave device transmits a motion interrupt to the master device via the SDIO/MOTION line to avoid arranging an additional motion output line and an additional motion pin.

Please refer to FIG. 2, it is a schematic block diagram of a navigation system 200 adopting a 2-wire interface according to one embodiment of the present disclosure. The navigation system 200 includes a master device 21 and a slave device 23, which are coupled to each other via two lines including a clock line 25 and an SDIO/MOTION line 27 to perform data transactions. The 2-wire interface is, for example, a 2-wire serial peripheral interface (abbreviated as 2-wire SPI), but not limited to the SPI.

The slave device 23 may be a human input device (HID) such as an optical navigation sensor device, a mouse device, a keyboard device or a joystick device, or any other types of devices that are adapted to use an SPI interface without particular limitations. Therefore, a motion detected in the present disclosure is determined according to a type of the slave device 23, including detecting a button/key being pressed, a device movement, a rod being operating, a knob being rotated due to the user operation. In one aspect, the slave device 23 is a sensor chip having multiple pins/pads and arranged inside the human input device.

The master device 21 is a computing device coupled to the slave device 23, e.g., including a processor, a micro-controller unit (MCU), a desktop computer, a notebook computer, a workstation or other computing devices that are adapted to use an SPI interface without particular limitations. The master device 21 is arranged inside or outside the human input device accordingly to different applications.

FIG. 2 shows a core logic and a buffer circuit of the master device 21, and the buffer circuit is used to buffer signals from the core logic. The master device 21 includes a clock port 211 and an SDIO/MOTION port 213.

The clock port 211 outputs a clock signal SCLK to the clock line 25.

The SDIO/MOTION port 213 outputs address bytes, and outputs/inputs data bytes via the SDIO/MOTION line 27 corresponding to a write operation or a read operation. For example, when the MOSI enables (e.g., using an enable signal) an I/O buffer Buf_1, the SDIO/MOTION port 213 operates in master_out_slave_in (i.e., shown as MOSI_Out); whereas, when the MOSI disables the I/O buffer Buf_1, the SDIO/MOTION port 213 operates in master_in_slave_out (i.e., shown as MISO_In), or vice versa.

In the present disclosure, the SDIO/MOTION port 213 further receives a motion interrupt (e.g., for informing the master device 21 regarding the slave device 23 leaving a low power mode, but not limited to) via the SDIO/MOTION line 27. The motion interrupt indicates that the slave device 23 detects a motion. As mentioned above, the motion is determined according to a type of the slave device 23.

FIG. 2 further shows a core logic and a buffer circuit of the slave device 23. The slave device 23 includes a clock port 231, an SDIO/MOTION port 233 and a counter 235.

The clock port 231 is used to receive the clock signal SCLK from the master device 21 via the clock line 25. The counter 235 is used to count the clock signal SCLK, e.g., a counting value is added by 1 when the clock signal SCLK is detected to have voltage changes from high to low and then from low to high (or one period).

The SDIO/MOTION port 233 receives the address bytes, and inputs/outputs data bytes via the SDIO/MOTION line 27 corresponding to the read operation or the write operation. For example, when the MISO enables (e.g., using an enable signal) an I/O buffer Buf_2, the SDIO/MOTION port 233 operates in master_in_slave_out (i.e., shown as MISO_Out, indicating a data direction in an output state); whereas, when the MISO disables the I/O buffer Buf_2, the SDIO/MOTION port 233 operates in master_out_slave_in (i.e., shown as MOSI_In, indicating a data direction in an input state), or vice versa.

In the present disclosure, the SDIO/MOTION port 233 further outputs a motion interrupt to the master device 21 via the SDIO/MOTION line 27. That is, the SDIO/MOTION line 27 is used to transmit both the SPI communication data (or called transaction data) and the motion interrupt.

Figure 3:
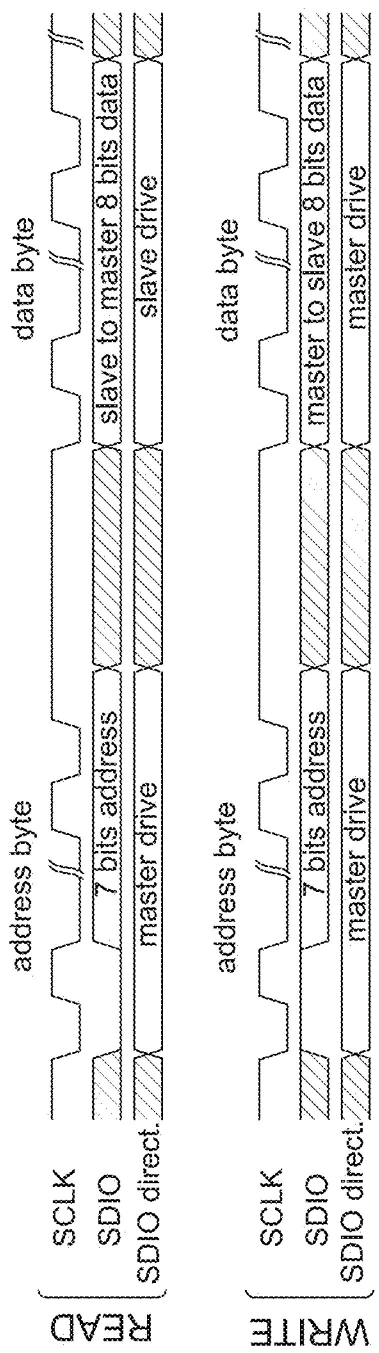
FIG. 3 is an operational schematic diagram of a 2-wire interface without sharing an SDIO pin and a motion pin according to one embodiment of the present disclosure.

Please refer to FIG. 3, it is an operational schematic diagram of a 2-wire interface in a synchronized status (or referred to normal status) according to one embodiment of the present disclosure. In a read operation (shown as READ), the master device 21 transfers 1-bit read request and 7-bits address (i.e. the address byte mentioned above) to the slave device 23 within 8 clocks of the clock signal SCLK, and reads 8-bits data (i.e. the data byte mentioned above) from a shift register 2351 of the slave device 23 within another 8 clocks of the clock signal SCLK. In a write operation (shown as WRITE), the master device 21 transfers 1-bit write request and 7-bits address (i.e. the address byte mentioned above) to the slave device 23 within 8 clocks of the clock signal SCLK, and writes 8-bits data (i.e. the data byte mentioned above) to the shift register 2351 of the slave device 23 within another 8 clocks of the clock signal SCLK. The methods of writing and reading the shift register 2351 are known to the art and not main objectives of the present disclosure, and thus details thereof are not described herein.

In FIG. 3, a time difference between the address byte and the data byte (e.g., shown by intervals filled with slant lines) is not particularly limited.

In other words, in one aspect, one data transaction includes an address phase within 8 clocks of the clock signal SCLK and a data phase within 8 clocks of the clock signal SCLK. As mentioned above, the read/write operation of the 2-wire interface is determined by enable/disable signals of the I/O buffers Buf_1 and Buf_2. When the shift register 1351 has 8 bits, each phase includes 8 clocks, but not limited to.

Figure 4:
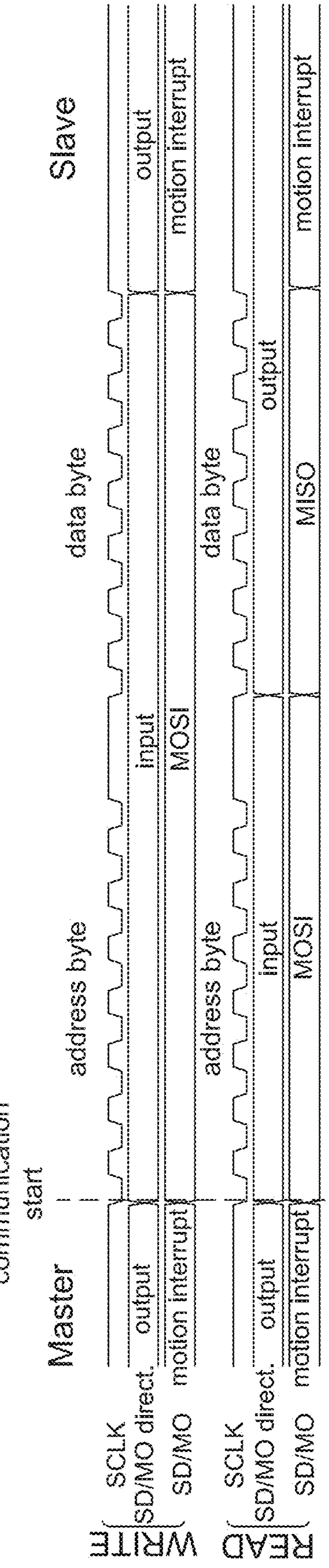
FIG. 4 is a signal timing diagram of a 2-wire SPI between a master device and a slave device of a navigation device with a combined SDIO/MOTION pin according to one embodiment of the present disclosure.

Please refer to FIGS. 2 and 4, FIG. 4 is a signal timing diagram of a 2-wire SPI with combined SDIO/MOTION line between a master device 21 and a slave device 23 of a navigation system 200 according to one embodiment of the present disclosure. In FIG. 4, the SD/MO direct. (abbreviated from SDIO/MOTION direction) indicates a data direction of the SDIO/MOTION port 233 of the slave device 23, and the SD/MO (abbreviated from SDIO/MOTION) indicates content transmitted via the SDIO/MOTION port 233 of the slave device 23, including a motion interrupt, MOSI and MISO.

In one aspect, the master device 21 is, for example, an MCU, and the slave device 12 is, for example, an optical navigation device (or sensor chip). The master device 21 and the slave device 23 communicate using a 2-wire interface.

The master device 21 outputs a clock signal SCLK via the clock line 25 of the 2-wire interface, and outputs an address byte and outputs/receives a data byte via the SDIO/MOTION line 27 of the 2-wire interface.

The slave device 23 includes a clock port 231, an SDIO/MOTION port 233 and a counter 235. The clock port 231 is used to receive the clock signal SCLK via the clock line 25 of the 2-wire interface. When the clock port 231 does not receive the clock signal SCLK via the clock line 25 of the 2-wire interface (e.g., the front and rear intervals during which the voltage of SCLK does not change as shown in FIG. 4), a data direction of the SDIO/MOTION port 233 is set as an output state (e.g., the SD/MO direct. of the slave device 23 showing output in FIG. 4) to be able to output a motion interrupt. In addition, when the clock port 231 receives the clock signal SCLK via the clock line 25 of the 2-wire interface (e.g., the central interval during which the voltage of SCLK changes high and low as shown in FIG. 4), the data direction of the SDIO/MOTION port 233 is set as an input state (e.g., the SD/MO direct. of the slave device 23 showing input in FIG. 4) so as to receive the address byte from the master device 21.

In one aspect, the data direction of the SDIO/MOTION port 233 of the slave device 23 is preset as the output state. As mentioned above, the data direction of the SDIO/MOTION port 233 is determined according to the MISO enable/disable signal.

In one aspect, when the address byte indicates a read operation (identified according to the read request), the slave device 23 changes the data direction of the SDIO/MOTION port 233 to the output state (e.g., MISO enabling Buf_2) to output a data byte after the counter 235 counts to 8, and keeps the data direction of the SDIO/MOTION port 233 at the output state (e.g., MISO enabling Buf_2) to be able to output the motion interrupt after the counter counts to 16 (i.e. reading data byte accomplished), as shown in FIG. 4. That is, the data direction of the SDIO/MOTION port 233 is in the input state only within the address phase.

In addition, when the read operation contains burst read data (e.g., outputting motion data, X displacement, Y displacement and setting data), the slave device 23 further changes the data direction of the SDIO/MOTION port 233 to the output state to be able to output the motion interrupt after the counter counts to 16 or to more than 16. The data direction of the SDIO/MOTION port 233 does not change even until the data phase is over, e.g., possibly larger than 16 clocks.

That is, the data direction (i.e. SD/MO direct.) of the SDIO/MOTION 233 of the slave device 23 is not limited to end the data phase after receiving 16 clock signals and the data phase is ended according to data amount to be transmitted. In one aspect, the slave device 23 identifies that the clock signal SCLK is received during the slave device 23 not communicating with the master device 21 and after identifying that the clock signal SCLK changes from a high level to a low level, e.g., the communication start shown in FIG. 4.

In one aspect, when the address byte indicates a write operation (determined according to the write request), the slave device 23 changes the data direction of the SDIO/MOTION port 233 from the input state to the output state (e.g., MISO enabling Buf_2) to be able to output the motion interrupt after the counter 235 counts to 16 (i.e. transmission of the address byte and data byte accomplished), as shown in FIG. 4.

In this way, the slave device 23 is able to transmit a motion interrupt using the SDIO/MOTION line 27 according to the clock signal SCLK when there is no communication on the 2-wire interface. In addition to reducing the minimum number of pins, the SDIO/MOTION line 27 is efficiently used.

Figure 5:
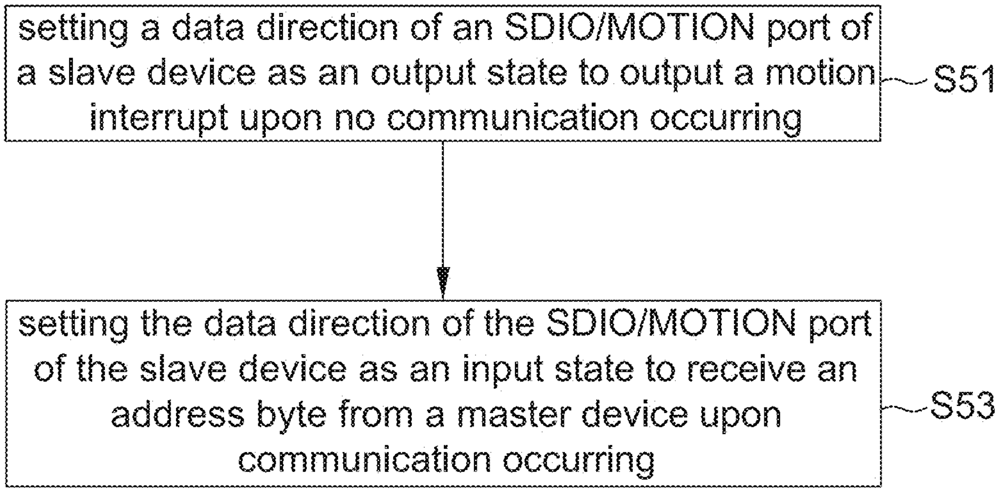
FIG. 5 is a flow chart of an operating method of a navigation device with a combined SDIO/MOTION pin according to one embodiment of the present disclosure.

Please refer to FIG. 5, it is a flow chart of an operating method of a navigation system 200 with shared data/motion pins. The operating method includes the steps of: setting a data direction of an SDIO/MOTION port 233 of a slave device 23 as an output state to output a motion interrupt upon no communication occurring (Step S51); and setting the data direction of the SDIO/MOTION port 233 of the slave device 23 to an input state to receive an address byte from a master device 21 upon communication occurring (Step S53). Details of these steps are referred to FIGS. 2 and 4. In the present disclosure, when the communication begins, the data direction of the SDIO/MOTION port 233 changes to an input state for at least 8-clocks.

As mentioned above, a time point of the data direction of the SDIO/MOTION port 233 of the slave device 23 changes from the input state to the output state is determined according to whether the master device 21 requests a read operation or a write operation.

For example, when the address byte indicates a read operation (e.g., containing a read request), the operating method further includes: changing the data direction of the SDIO/MOTION port 233 of the slave device 23 from the input state to the output state to output a data byte after a counter 235 of the slave device 23 counts to 8, and keeping the data direction of the SDIO/MOTION port 233 of the slave device 23 at the output state to be able to output the motion interrupt after the counter 235 of the slave device 23 counts to 16.

For example, when the address byte indicates a write operation (e.g., containing a write request), the operating method further includes: changing the data direction of the SDIO/MOTION port 233 of the slave device 23 from the input state to the output state to be able to output the motion interrupt after a counter 235 of the slave device 23 counts to 16.

It is appreciated that when the data direction of the SDIO/MOTION port 233 of the slave device 23 is set as the output state, a data direction of the SDIO/MOTION port 213 of the slave device 21 is correspondingly set as an input state (e.g., MOSI enabling Buf_1) to be able to receive the motion interrupt from the slave device 23.

In the present disclosure, the master device 21 includes a first processor, e.g., MCU or central processing unit (CPU) running operations thereof using hardware, software and/or firmware. For example, the core logic and the buffer circuit of the master device 21 are embedded in the first processor. The slave device 23 includes a second processor, e.g., a digital signal processor, an application specific integrated circuit or a field programmable gate array running operations thereof using hardware, software and/or firmware. For example, the core logic and the buffer circuit of the slave device 23 are embedded in the second processor.

It should be mentioned that values given in the present disclosure are only intended to illustrate but not to limit the present disclosure.

It should be mentioned that although the above embodiment is illustrated using a 2-wire SPI as an example, the present disclosure is not limited thereto. The pin sharing technique of the present disclosure is also adaptable to a 3-wire SPI that determines the transmission content of the SDIO/MOTION pin according to the SCLK signal instead of according to a voltage on the NCS pin.

As mentioned above, in the conventional 4-wire SPI, although it is possible to combine a motion pin to the MISO pin and to determine data content according to a voltage on the NCS pin so as to reduce the minimum number of pins, this method cannot be applied to a 3-wire SPI or 2-wire SPI, and the MISO signal line is not used at its maximum utilization rate. Accordingly, the present disclosure further provides a navigation device and a navigation system including the same that are adapted to use a 2-wire interface with shared pins (e.g., referring to FIG. 2) and an operating method thereof (e.g., referring to FIGS. 4-5). In the present disclosure, the clock signal SCLK is used as a mode selector so as to cause the SDIO/MOTION line to transmit signals/data of different types under different modes (e.g., including an SPI data communication mode and SPI data non-communication mode) so as to realize the purpose of minimizing the number of pins/pads.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

The invention claimed is:

1. A navigation system, comprising:

a master device, configured to output a clock signal and an address byte; and a slave device, communicating with the master device using an interface having only two lines to perform data transactions, the slave device configured to set a data direction of an I/O port thereof as an output state to output a motion interrupt, which is configured to inform the master device that the slave device leaves a low power mode, upon not receiving the clock signal via a clock line of the interface, and change the data direction of the I/O port to an input state to receive the address byte from the master device upon receiving the clock signal via the clock line of the interface, wherein the clock signal is configured as a mode selector of a data communication mode, which is configured to perform the data transactions, and a data non-communication mode, which is configured to transmit the motion interrupt from the slave device to the master device.

2. The navigation system as claimed in claim 1, wherein the slave device comprises a counter and when the address byte indicates a read operation, the slave device is further configured to change the data direction of the I/O port to the output state to output a data byte after the counter counts to 8, and keep the data direction of the I/O port at the output state to output the motion interrupt after the counter counts to 16.

3. The navigation system as claimed in claim 1, wherein the slave device comprises a counter and when the address byte indicates a write operation, the slave device is further configured to change the data direction of the I/O port to the output state to output the motion interrupt after the counter counts to 16.

4. The navigation system as claimed in claim 1, wherein the data direction of the I/O port of the slave device is preset as the output state.

5. The navigation system as claimed in claim 1, wherein the slave device is configured to identify the clock signal being received during the slave device not communicating with the master device and after identifying that the clock signal changes from a high level to a low level.

6. The navigation system as claimed in claim 1, wherein the interface is a serial peripheral interface.

7. The navigation system as claimed in claim 2, wherein upon the read operation containing burst read data, the slave device is further configured to keep the data direction of the I/O port to the output state to output the motion interrupt after the counter counts to 16 or to more than 16, and the slave device is a mouse device.

8. A navigation device, configured to communicate with a master device via an interface having only two lines to perform data transactions, the navigation device comprising:

a clock port, configured to receive a clock signal via a clock line of the interface; and an I/O port, wherein a data direction of the I/O port is set as an output state to output a motion interrupt, which is configured to inform the master device that the navigation device leaves a low power mode, upon the clock port not receiving the clock signal via the clock line of the interface, and the data direction of the I/O port is changed to an input state to receive an address byte from the master device upon the clock port receiving the clock signal via the clock line of the interface, wherein the clock signal is configured as a mode selector of a data communication mode, which is configured to perform the data transactions, and a data non-communication mode, which is configured to transmit the motion interrupt from the navigation device to the master device.

9. The navigation device as claimed in claim 8, further comprising a counter, wherein when the address byte indicates a read operation, the navigation device is further configured to change the data direction of the I/O port to the output state to output a data byte after the counter counts to 8, and keep the data direction of the I/O port at the output state to output the motion interrupt after the counter counts to 16.

10. The navigation device as claimed in claim 8, further comprising a counter, wherein when the address byte indicates a write operation, the navigation device is further configured to change the data direction of the I/O port to the output state to output the motion interrupt after the counter counts to 16.

11. The navigation device as claimed in claim 8, wherein the data direction of the I/O port of the navigation device is preset as the output state.

12. The navigation device as claimed in claim 8, wherein the navigation device is configured to identify the clock signal being received during the navigation device not communicating with the master device and after identifying that the clock signal changes from a high level to a low level.

13. The navigation device as claimed in claim 8, wherein the interface is a serial peripheral interface.

14. The navigation device as claimed in claim 9, wherein upon the read operation containing burst read data, the navigation device is further configured to keep the data direction of the I/O port to the output state to output the motion interrupt after the counter counts to 16 or to more than 16.

15. An operating method of a navigation system, the navigation system comprising a master device and a slave device performing a communication therebetween via an interface having only two lines, one of which is a clock line for sending a clock signal, to perform data transactions, the operating method comprising:

setting a data direction of an I/O port of the slave device as an output state to output a motion interrupt, which is configured to inform the master device that the slave device leaves a low power mode, via the interface upon the communication not occurring; and setting the data direction of the I/O port of the slave device to an input state to receive an address byte from the master device via the interface upon the communication occurring, wherein the clock signal is configured as a mode selector of a data communication mode, which is configured to perform the data transactions, and a data non-communication mode, which is configured to transmit the motion interrupt from the slave device to the master device.

16. The operating method as claimed in claim 15, wherein when the address byte indicates a read operation, the operating method further comprises:

changing the data direction of the I/O port of the slave device to the output state to output a data byte after a counter of the slave device counts to 8, and keeping the data direction of the I/O port of the slave device at the output state to output the motion interrupt after the counter of the slave device counts to 16.

17. The operating method as claimed in claim 15, wherein when the address byte indicates a write operation, the operating method further comprises:

changing the data direction of the I/O port of the slave device to the output state to output the motion interrupt after a counter of the slave device counts to 16.

18. The operating method as claimed in claim 15, wherein the data direction of the I/O port of the slave device is preset as the output state.

19. The operating method as claimed in claim 15, wherein the interface is a serial peripheral interface.

20. The operating method as claimed in claim 15, wherein the motion interrupt does not contain motion data detected by the slave device.

* * * * *